(12) United States Patent
Sun et al.

(10) Patent No.: US 12,449,403 B2
(45) Date of Patent: Oct. 21, 2025

(54) FLOOR MATERIAL IDENTIFICATION METHOD, SYSTEM AND DEVICE, AND STORAGE MEDIUM

(71) Applicant: MIDEA ROBOZONE TECHNOLOGY CO., LTD., Suzhou (CN)

(72) Inventors: Tao Sun, Suzhou (CN); Liping Hu, Suzhou (CN); Wenhao Wang, Suzhou (CN); Xiaoying Lu, Suzhou (CN); Qingdong Zhou, Suzhou (CN); Zhian Yu, Suzhou (CN); Fuping Cheng, Suzhou (CN)

(73) Assignee: MIDEA ROBOZONE TECHNOLOGY CO., LTD., Suzhou (CN)

( * ) Notice: Subject to any disclaimer, the term of this patent is extended or adjusted under 35 U.S.C. 154(b) by 306 days.

(21) Appl. No.: 18/026,817

(22) PCT Filed: Feb. 25, 2021

(86) PCT No.: PCT/CN2021/077834
§ 371 (c)(1),
(2) Date: Mar. 16, 2023

(87) PCT Pub. No.: WO2022/057209
PCT Pub. Date: Mar. 24, 2022

(65) Prior Publication Data
US 2023/0324343 A1   Oct. 12, 2023

(30) Foreign Application Priority Data
Sep. 17, 2020   (CN) .......................... 202010983034.2

(51) Int. Cl.
| | | |
|---|---|---|
| G01N 29/12 | (2006.01) | |
| G01N 29/46 | (2006.01) | |
| G06F 18/214 | (2023.01) | |

(52) U.S. Cl.
CPC ............ *G01N 29/12* (2013.01); *G01N 29/46* (2013.01); *G06F 18/214* (2023.01); *G01N 2291/023* (2013.01)

(58) Field of Classification Search
CPC .. G01N 29/12; G01N 29/46; G01N 2291/023; G01N 29/4427;
(Continued)

(56) References Cited

U.S. PATENT DOCUMENTS

| | | | |
|---|---|---|---|
| 2014/0214205 A1 | 7/2014 | Kwon et al. | |
| 2022/0280005 A1* | 9/2022 | Lai | .......................... A47L 9/2836 |

FOREIGN PATENT DOCUMENTS

| | | |
|---|---|---|
| CN | 1242692 A | 1/2000 |
| CN | 101883526 A | 11/2010 |

(Continued)

OTHER PUBLICATIONS

ISR mailed Jun. 9, 2021 corresponding to PCT/CN2021/077834.
(Continued)

*Primary Examiner* — Xin Y Zhong
(74) *Attorney, Agent, or Firm* — K&L Gates LLP

(57) ABSTRACT

Provided are a floor material identification method, system and device, and a storage medium. The floor material identification method the floor material identification method includes: acquiring a vibration signal generated by a cleaning robot when operating on a floor of a material of a plurality of materials; determining at least one identification parameter for floor material identification based on the vibration signal; and identifying a floor material type based on the at least one identification parameter. Floor materials
(Continued)

are distinguished by characteristics of different vibration signals from the floor of different materials, and thus problems such as high cost, low reliability and inaccurate identification result of the existing floor material identification method can be solved.

9 Claims, 5 Drawing Sheets

(58) Field of Classification Search
CPC .......... G01N 2291/2632; G01N 29/14; G01N 29/4454; G01N 29/4481; G01N 29/045; G01N 29/4472; G01N 2291/0232; G06F 18/214; G06F 18/2131; G06F 18/24133; G06F 2218/08
See application file for complete search history.

(56) References Cited

FOREIGN PATENT DOCUMENTS

| CN | 103093234 | A | 5/2013 |
|---|---|---|---|
| CN | 107505392 | A | 12/2017 |
| CN | 109199216 | A | 1/2019 |
| CN | 109542224 | A | 3/2019 |
| CN | 110147826 | A | 8/2019 |
| CN | 111027627 | A | 4/2020 |
| CN | 111443033 | A | 7/2020 |
| CN | 112198222 | A | 1/2021 |
| JP | 2009172235 | A | 8/2009 |
| WO | 2014032181 | A1 | 3/2014 |

OTHER PUBLICATIONS

The written opinion of ISA received in the counterpart PCT application PCT/CN2021/077834, dated Jun. 9, 2021, 9 pages with English translation.

The first office action received in the counterpart CN application 202010983034.2, dated May 27, 2021, 10 pages with English translation.

The Grant Notice received in the counterpart CN application 202010983034.2, dated Mar. 11, 2022, 3 pages with English translation.

* cited by examiner

FLOOR MATERIAL IDENTIFICATION METHOD, SYSTEM AND DEVICE, AND STORAGE MEDIUM

CROSS-REFERENCES TO RELATED APPLICATIONS

The present disclosure is a national phase application of International Application No. PCT/CN2021/077834, filed on Feb. 25, 2021, which claims priority to and the benefit of Patent Application No. 202010983034.2 filed on Sep. 17, 2020 in China National Intellectual Property Administration (CNIPA), the entire content of which is incorporated herein by reference.

FIELD

The present disclosure relates to the field of machine identification technologies, and in particular, to a floor material identification method, system and device, and a storage medium.

BACKGROUND

With the development and progress of social civilization, a variety of artificial intelligence (AI) products are continuously applied in all aspects of human life. In daily life, house cleaning is significant, and thus sweeping robots are used to liberate users from daily cleaning work by automatically completing household cleaning work.

A floor in a house may be floored with carpets, timber floors, or floor tiles in different regions of the floor. A carpet-avoiding operation is a demanding function during an operation of a sweeper or mopping robot. In addition, when a sweeping-mopping robot is operating at a critical region of a carpet/non-carpet floor, a cleaning mode needs to be adjusted timely. Further, when the sweeper is operating at the critical region of the carpet/non-carpet floor, adjustment of a suction force is mainly one of the important intelligent developing points of the sweeper when the cleaning mode is adjusted timely. Therefore, floor material identification is very necessary, and the sweeper robot is required to accurately identify floor materials in order to perform corresponding cleaning mode for targeted cleaning.

In the existing floor material identification technologies, ultrasonic sensors are used for the floor material identification. However, the sensors are expensive, resulting in a significant increase in cost; or visual hardware cooperates with complex algorithms to perform the floor material identification. However, due to complexity of the algorithm, the implementation cost and efficiency are not satisfactory. In addition, with multi-sensor fusion schemes, such as a scheme in which a rolling brush or an edge brush is employed, when the rolling brush or the edge brush of the floor sweeper is twined with hair, a current of a motor would be increased, which may be easily confused with an increase of a current of the motor when the floor sweeping machine is operating on the carpet. Therefore, the identification reliability is low.

In view of the above, there is a need for a more reliable floor material identification technology with low cost and high accuracy.

SUMMARY

Embodiments of the present disclosure provide a floor material identification method, system and device, and a storage medium, which are intended to solve problems such as high cost, low reliability, and inaccurate identification result of the existing floor material identification technology.

According to one embodiments of the present disclosure, there is provided a floor material identification method applied in a cleaning robot. The floor material identification method includes: acquiring a vibration signal generated by a cleaning robot when operating on a floor of a material among a plurality of materials; determining at least one identification parameter for floor material identification based on the vibration signal; and identifying a floor material type based on the at least one identification parameter.

In some embodiments of the present disclosure, the at least one identification parameter includes a low frequency band range of the vibration signal, a high frequency band range of the vibration signal, and a threshold relating to a ratio of low frequency band energy to high frequency band energy of the vibration signal.

In some embodiments of the present disclosure, determining at least one identification parameter for floor material identification based on the vibration signal includes: setting a predetermined low frequency band range and a predetermined high frequency band range for the vibration signal; determining low frequency band energy and high frequency band energy of the vibration signal based on the predetermined low frequency band range and predetermined high frequency band range; determining a ratio of the low frequency band energy to the high frequency band energy of the vibration signal as an identification feature; and obtaining the at least one identification parameter by inputting the identification feature into a classifier for training.

In some embodiments of the present disclosure, determining at least one identification parameter for floor material identification based the vibration signal includes: obtaining, based on a time domain signal formed by the vibration signal, a frequency signal of the floor of the material among the plurality of materials through frequency spectrum analysis; setting a predetermined low frequency band range and a predetermined high frequency band range for the frequency signal; determining low frequency band energy and high frequency band energy of the frequency signal based on the predetermined low frequency band range and the predetermined high frequency band range; determining a ratio of the low frequency band energy to the high frequency band energy of the frequency signal as an identification feature; and obtaining the at least one identification parameter by inputting the identification feature into a classifier for training.

In some embodiments of the present disclosure, obtaining, based on a time domain signal formed by the vibration signal, a frequency signal of the floor of the material among the plurality of materials through the frequency spectrum analysis includes: obtaining a windowed time domain signal by windowing the time domain signal formed by the vibration signal; and obtaining, based on the windowed time domain signal, the frequency signal through the frequency spectrum analysis.

In some embodiments of the present disclosure, the floor material identification method further includes, subsequent to obtaining a frequency signal of the floor of the material among the plurality of materials: labeling the frequency signal with a hard floor or a soft floor. The hard floor includes a floor tile, a wooden floor, and a marble, and the soft floor includes a carpet and a plastic cement.

In some embodiments of the present disclosure, identifying a floor material type based on the at least one identification parameter includes: acquiring a to-be-identified vibration signal generated on a to-be-identified floor; and identifying the to-be-identified vibration signal based on the at least one identification parameter to obtain a floor material classification.

According to one embodiments of the present disclosure, there is provided a floor material identification system. The floor material identification system includes a vibration signal acquisition device, an identification parameter determination device, and a material identification device. The vibration signal acquisition device is configured to acquire a vibration signal generated by a cleaning robot when operating on a floor of a material of a plurality of materials. The identification parameter determination device is configured to determine at least one identification parameter for floor material identification based on the vibration signal. The material identification device is configured to identify a floor material type based on the at least one identification parameter.

According to one embodiments of the present disclosure, there is provided a floor material identification device. The floor material identification device includes a memory configured to store executable instructions, and a processor configured to be connected to the memory to execute the executable instructions to implement the floor material identification method.

According to one embodiments of the present disclosure, there is provided a computer-readable storage medium having a computer program stored thereon. The computer program, when executed by a processor, implements the floor material identification method.

With the floor material identification method, system and device, and the storage medium according to the embodiments of the present disclosure, the floor material identification method includes: acquiring a vibration signal generated on a floor of a material of a plurality of materials; determining at least one identification parameter for floor material identification based on the vibration signal; and identifying a floor material type based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

BRIEF DESCRIPTION OF THE DRAWINGS

The accompanying drawings described herein are intended to provide a further understanding of the present disclosure and constitute a part of this application. Illustrative embodiments of the disclosure and description thereof are intended to explain, rather than limiting, the present disclosure. In the drawings.

DETAILED DESCRIPTION OF THE DISCLOSURE

During implementing the present disclosure it was found that in the existing floor material identification technologies, ultrasonic sensors are used for floor material identification. However, the sensors are expensive, resulting in a significant increase in cost; or visual hardware cooperates with complex algorithms to perform the floor material identification. However, due to complexity of the algorithm, the implementation cost and efficiency are not satisfactory. In addition, with multi-sensor fusion schemes, such as a scheme in which a rolling brush or an edge brush is employed, when the rolling brush or the edge brush of a floor sweeper is twined with hair, a current of a motor would be increased, which may be easily confused with an increase of a current of the motor when the floor sweeping machine is operating on a carpet. Therefore, the identification reliability is low. In view of the above, there is a need for a more reliable floor material identification technology with low cost and high accuracy.

In addition, the applicant has also found that when the sweeper operates on the floor, a body of the sweeper keeps vibrating, and the floor of a material of a plurality of materials has different mitigation and absorption effects on vibration signals. For example, a soft floor such as a carpet has significant damping and absorption effects on a high frequency vibration signal. Therefore, with a floor material identification method according to some embodiments of the present disclosure, it is possible to identify a floor material based on different vibration signals acquired on the floor of the material among the plurality of materials.

The floor material identification of the present disclosure can be analyzed and identified by a time domain signal of the vibration signal, or can also be identified based on a frequency signal transformed from the vibration signal.

Figure 1:
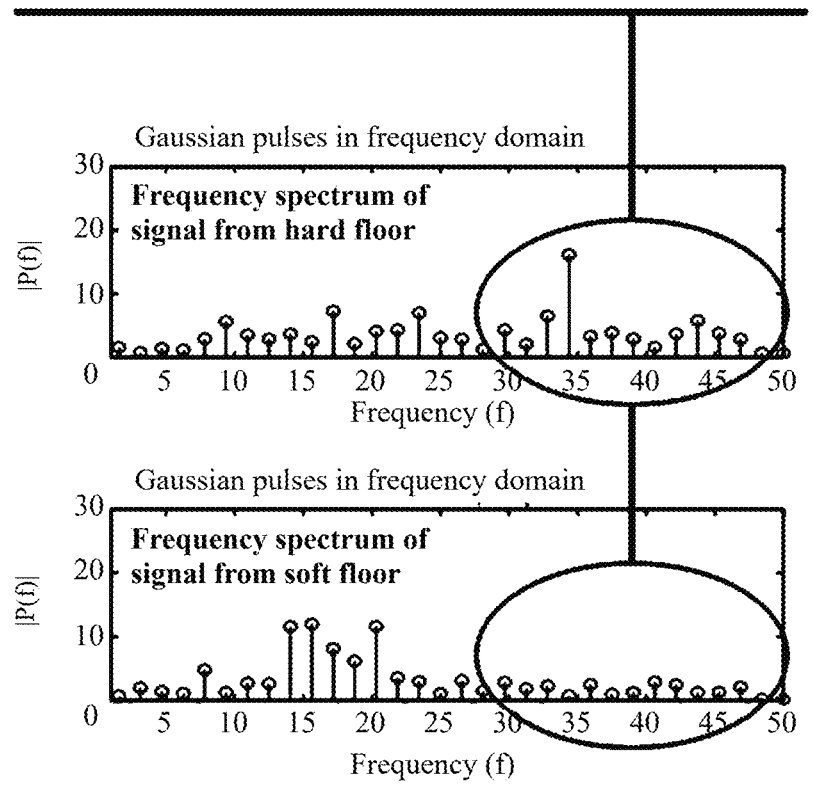
FIG. 1 is a schematic diagram showing frequency spectrum of various floor materials in a floor material identification method according to the present disclosure.

FIG. 1 is a schematic diagram showing frequency spectrum of various floor materials in the floor material identification method according to some embodiments of the present disclosure. Taking the identification performed by the frequency signal transformed based on the vibration signal as an example, firstly, a vibration signal of the body of the sweeper is recorded by an accelerometer of a gyroscope in the sweeper, and then corresponding frequency spectrum components are obtained through frequency analysis. Frequency spectrum characteristics of the floor of different materials are determined as at least one identification parameter to further determine a material of a to-be-identified floor.

It can be seen from FIG. 1 that the numbers and frequencies at which high frequency bands and low frequency bands of the frequency spectrum of the floor of different materials occur are different from each other. Therefore, in some embodiments of the present disclosure, a ratio of low frequency band energy to high frequency band energy of the frequency spectrum within a period of time is determined as an identification feature, and then a reasonable threshold relating to the ratio is set. During the identification, the ratio of the low frequency band energy to the high frequency band energy of the vibration signal of the to-be-identified material floor is compared with the threshold to determine the material of the to-be-identified floor.

In this process, a reasonable identification parameter is needed. That is, a reasonable low frequency band range, high frequency band range, and threshold are needed to be divided. In some embodiments of the present disclosure, the at least one identification parameter is trained by a classifier, and a division in which the identification result has the highest accuracy is determined as a final identification parameter.

In view of the above, in the floor material identification method according to some embodiments of the present disclosure, a vibration signal generated on a floor of a material of a plurality of materials is required, at least one identification parameter for floor material identification is then determined based on the vibration signal, and then a floor material type is identified based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

The floor material identification sweeper according to the embodiments of the present disclosure reuses the existing accelerometer of the sweeper on the basis of components of the existing sweeper. Thus, the floor material identification sweeper according to the embodiments of the present disclosure has low cost input and high identification accuracy and robustness during the identification. The identification effect is related to the accelerometer of the sweeper. Further, even if hair is twined around a main roller or other parts of the sweeper, the vibration signal and frequency components would not be changed. As a result, the identification performance of the sweeper is stable, and the reliability of the floor material identification can be enhanced.

The sweeper or a sweeping-mopping robot with a similar function can avoid the floor of the carpet for further operation after the floor material has been identified; or at a critical region of carpet/non-carpet floor, the sweeper or the sweeping-mopping robot can adjust a cleaning mode timely, for example switch among various modes including a simultaneous sweeping-and-mopping mode, an only-sweeping mode, or an only-mopping mode. Meanwhile, the sweeper or the sweeping-mopping robot can adjust a suction force of the cleaning mode timely at a critical region of the floor of different materials.

The embodiments of the present disclosure are described in the following description of the exemplary embodiments of the present disclosure with reference to the accompanying drawings is made in further detail. The described embodiments are merely a part, rather than all, of the embodiments of the present disclosure. It is noted that the embodiments and features of the embodiments in the present disclosure can be combined with each other without conflict.

Figure 2:
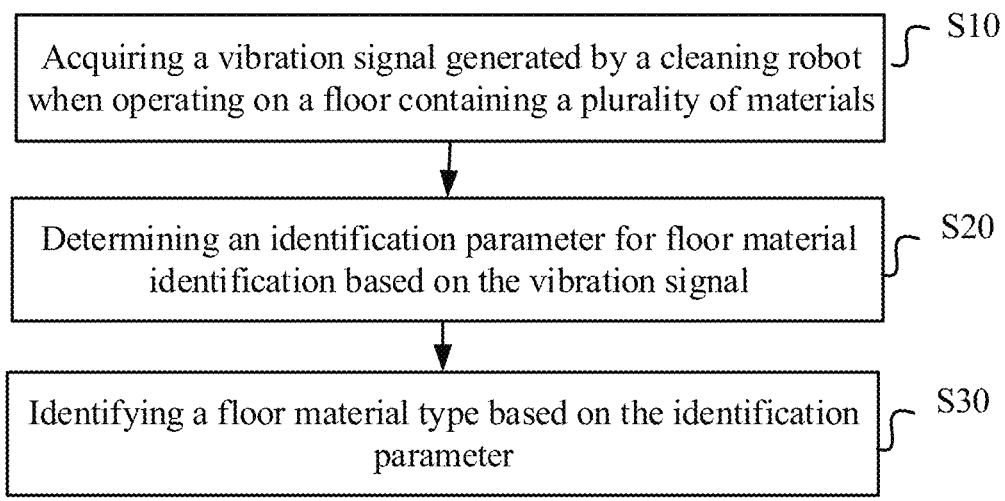
FIG. 2 is a schematic diagram showing steps of a floor material identification method according to an embodiment of the present disclosure.

FIG. 2 is a schematic diagram showing steps of a floor material identification method according to an embodiment of the present disclosure.

As shown in FIG. 2, the floor material identification method according to some embodiments of the present disclosure includes actions at S10 and S20.

At S10, a vibration signal generated by a sweeper or cleaning robot when operating on a floor of a material of a plurality of materials is acquired.

In the present disclosure, by means of a machine, which continuously vibrates during its operation, of the cleaning robot such as the sweeper, a mopping robot, or a sweeping-mopping robot based on different degrees of vibration mitigation and absorption by the floor of different materials, the vibrating machine can generate different vibration signals on the floor of the different materials. These vibration signals can be simultaneously acquired by means of a vibration signal acquisition device such as an accelerometer of a gyroscope disposed in the sweeper, the mopping robot, or the sweeping-mopping robot.

At S20, at least one identification parameter for floor material identification is determined based on the vibration signal.

The numbers and frequencies at which high frequency bands and low frequency bands of the vibration signals from the floor of different materials or frequency signals transformed from the vibration signals occur are different from each other. As a result, in some embodiments of the present disclosure, a ratio of low frequency band energy to high frequency band energy of the vibration signal or the frequency signal within a period of time is determined as an identification feature, and then a reasonable threshold relating to the ratio is set to perform the identification.

In this process, a reasonable identification parameter is needed. That is, a reasonable low frequency band range, high frequency band range, and threshold are needed to be divided. In some embodiments of the present disclosure, the identification parameter is trained by a classifier, and a division in which the identification result has the highest accuracy is determined as a final identification parameter.

Therefore, the at least one identification parameter to be determined in the present disclosure includes a low frequency band range of the vibration signal, a high frequency band range of the vibration signal, and the threshold relating to the ratio of the low frequency band energy to the high frequency band energy of the vibration signal.

The floor material identification according to the embodiments of the present disclosure may be analyzed and identified through a time domain signal of the vibration signal, or may be identified based on a frequency signal transformed from the vibration signal.

Figure 3:
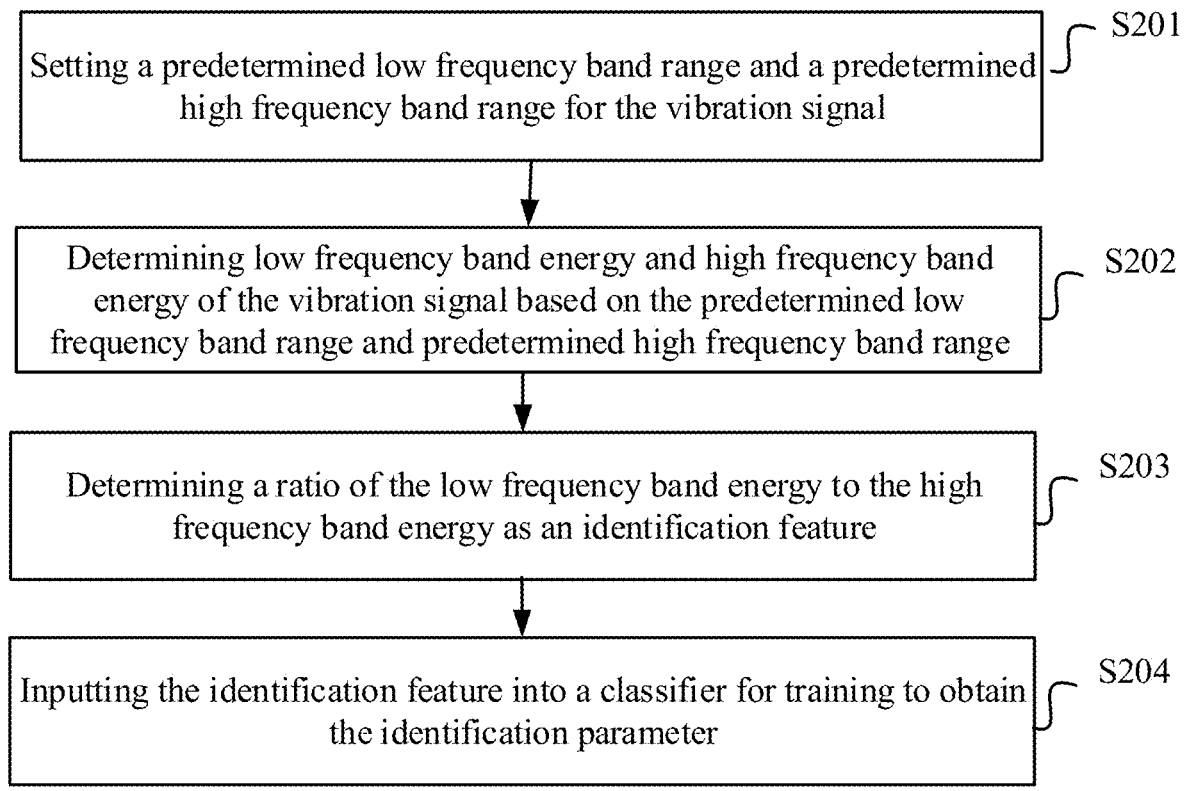
FIG. 3 is a schematic diagram showing identification steps based on a vibration signal in a floor material identification method according to an embodiment of the present disclosure.

FIG. 3 is a schematic diagram showing identification steps based on a vibration signal in a floor material identification method according to an embodiment of the present disclosure.

As shown in FIG. 3, the performing the floor material identification based on the time domain signal of the vibration signal in the floor material identification method according to the embodiments of the present disclosure includes actions at S201 to S204.

At S201, a predetermined low frequency band range and a predetermined high frequency band range for the vibration signal are set.

At S202, low frequency band energy and high frequency band energy of the vibration signal are determined based on the predetermined low frequency band range and predetermined high frequency band range.

At S203, a ratio of the low frequency band energy to the high frequency band energy is determined as an identification feature.

At S204, the at least one identification parameter is obtained by inputting the identification feature into a classifier for training.

In the present disclosure, when identifying the floor material, a low frequency band range and a high frequency band range of a vibration signal of a floor of a to-be-identified material are determined based on the at least one identification parameter. Then, a total energy of the low frequency band range and a total energy of the high frequency band ranges are calculated, respectively. Finally, the material of the floor of the to-be-identified material is determined by comparing the ratio of the low frequency band energy to the high frequency band energy with the threshold. For example, when the ratio of the low frequency band energy to the high frequency band energy falls within a threshold relating to a ratio of low frequency band energy to high frequency band energy of a floor of a carpet, it is determined that the floor is hard.

In this process, an accurate identification parameter needs to be obtained. That is, a reasonable low frequency band range, high frequency band range, and threshold needs to be obtained. Thus, in the present disclosure, the low frequency band range, the high frequency band range, and the threshold relating to the ratio of the low frequency band energy to the high frequency band energy are determined by training the identification parameter by the classifier. The training is performed repeatedly until a division in which the identification result has the highest accuracy is obtained as the final identification parameter. After the final identification parameter is obtained, the accurate identification of the floor material can be realized, and the identification accuracy of the classifier on the floor identification is greatly improved.

The classifier may use a neural network classifier, and may also use support vector machine, or other classification methods.

In some embodiments of the present disclosure, the floor material identification method further includes, prior to S201: labeling the frequency signal with a hard floor or a soft floor. The hard floor includes a floor tile, a wooden floor, and a marble, and the soft floor includes a carpet and a plastic cement.

In an embodiment, a time domain vibration signal is windowed. For example, a continuous time domain signal is divided into segments in seconds. That is, a rectangular window is added.

The windowed time domain signal is labeled with the hard floor and the soft floor. That is, the windowed time domain signal is classified into two categories including a windowed time domain labeled with the hard floor, and a windowed time domain labeled with the soft floor. The windowed time domain labeled with the hard floor may indicates a floor tile, a wooden floor, a marble, and the like, and the windowed time domain labeled with the soft floor may indicates a floor of a carpet.

The identification feature is determined as an energy ratio of the low frequency band and the high frequency band, i.e., the ratio of the low frequency band energy to the high frequency band energy.

During this process, it is necessary to input the identification feature into the classifier for training and learning. In addition, for the identification feature, it is necessary to determine the at least one identification parameter such as the low frequency band range, the high frequency band range, and the threshold relating to the ratio of the low frequency band energy to the high frequency band energy.

In some embodiments of the present disclosure, the division of the frequency band refers to the beginning and ending of the low frequency band and the high frequency band. For example, for the frequency spectrum ranging from 0 Hz to 50 Hz, a frequency spectrum ranging from 5 Hz to 20 Hz is defined as the low frequency band, and a frequency spectrum ranging from 25 Hz to 40 Hz is defined as the high frequency band, which is one of the divisions of the frequency band. The ratio of the low frequency band energy to the high frequency band energy is determined as the identification feature.

The training refers to finding the best division among all the above feasible divisions. For example, there are thousands of divisions for the low frequency band and the high frequency band based on the arrangement and combination modes, and each possible division has a corresponding final identification accuracy. The division corresponding to the highest identification accuracy is determined as a training result. Similarly, the training of the threshold relating to the ratio of the low frequency band energy to the high frequency band energy is the same to the above. In addition, the learning of the threshold refers to setting a threshold for one classification to maximize the classification accuracy of the two types of signals.

Figure 4:
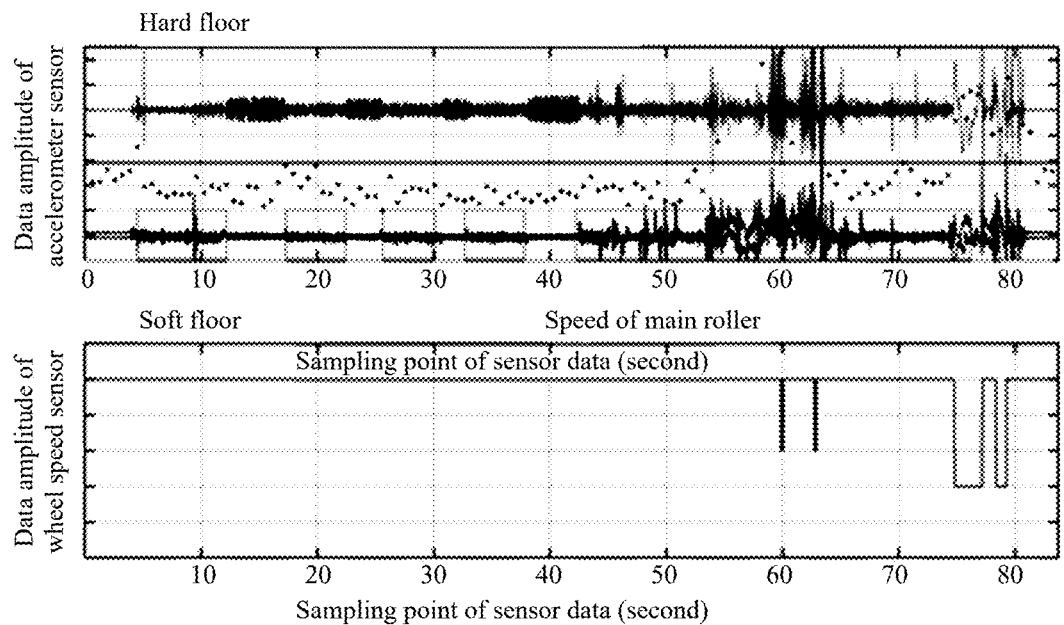
FIG. 4 is a schematic diagram showing vibration signals respectively acquired on a hard floor and a soft floor in a floor material identification method according to an embodiment of the present disclosure.

FIG. 4 is a schematic diagram showing vibration signals respectively acquired on a hard floor and a soft floor in a floor material identification method according to an embodiment of the present disclosure.

As shown in FIG. 4, the characteristics of the signals of the hard floor and the soft floor, i.e., circle points in FIG. 4, are defined as points in a mathematical space, and the threshold relating to the ratio of the low frequency band energy and the high frequency band is defined as a dividing straight line, i.e., the horizontal line in the middle of FIG. 4. The hard floor is identified below the threshold, i.e., below the horizontal line, and the soft floor is identified above the threshold, i.e., above the horizontal line.

After the above steps are completed, the at least one identification parameter obtained through the training, i.e., the frequency spectrum division (the low frequency band range, the high frequency band range, and the threshold relating to the ratio of the low frequency band energy to the high frequency band energy), is input into the sweeper or the cleaning robot, to realize a real-time identification of the floor material.

In some embodiments of the present disclosure, at S30, the floor material type is identified based on the at least one identification parameter. Firstly, to-be-identified vibration signals generated on the to-be-identified floor are acquired, and then the to-be-identified vibration signals are identified based on the at least one identification parameter to obtain the floor material classification.

During the identification, the low frequency band range and the high frequency band range of the vibration signals from the floor of the-to-be-identified material are divided based on the at least one identification parameter, then the total energy of the low frequency band range and the total energy of the high frequency band range are calculated, respectively, and finally the material of the floor of the to-be-identified material is determined by comparing the ratio of the low frequency band energy to the high frequency band energy with the threshold. For example, when the ratio of the low frequency band energy to the high frequency band energy falls within a threshold relating to a ratio of low frequency band energy and high frequency band energy of a floor of a carpet, it is determined that the floor is hard.

Figure 5:
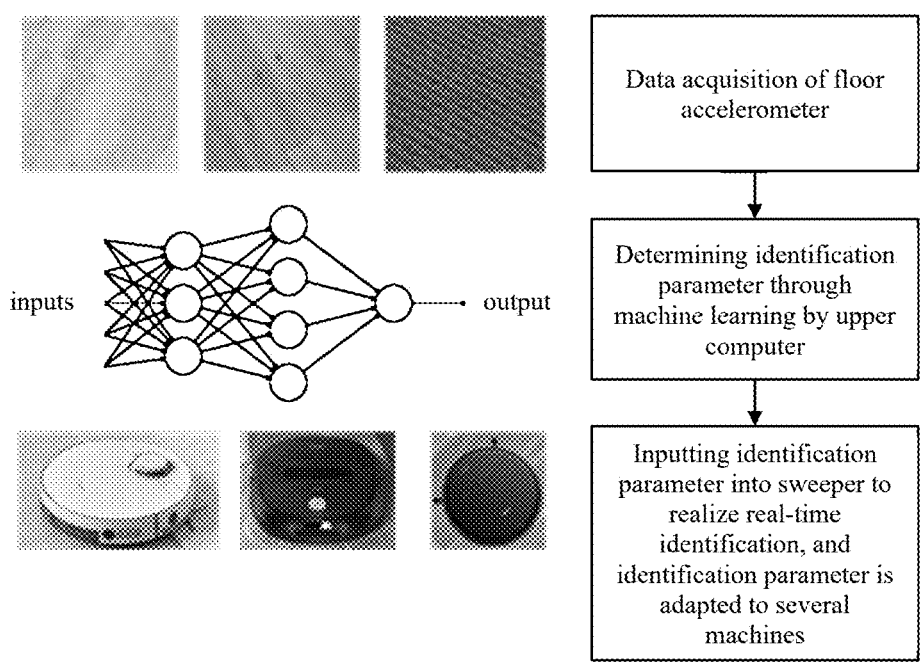
FIG. 5 is a schematic flowchart showing a floor material identification method according to an embodiment of the present disclosure.

FIG. 5 is a schematic flowchart showing a floor material identification method according to an embodiment of the present disclosure.

Vibration signals are acquired on various floors by a sweeper or a cleaning robot. The sweeper or the cleaning robot should be provided with an acceleration sensor, and the number of axes is not limited. The acceleration sensor can record the vibration signals from a body of the sweeper or the cleaning robot.

Further, the floor identification is based on the ratio of the low frequency band energy to the high frequency band energy. For example, a machine learning method may be used to train and learn the obtained vibration signals on an upper computer to obtain the most accurate identification parameter for the floor material classification.

Furthermore, the identification parameter is input into the sweeper or the cleaning robot for real-time floor material identification, and is adapted to the sweeper or the cleaning robot with different models and functions.

In the floor material identification method according to some embodiments of the present disclosure, the vibration signal generated by the cleaning robot when operating on the floor of the material among the plurality of materials is acquired, then the at least one identification parameter for the floor material identification is determined based on the vibration signal, and then the floor material type is identified based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

The floor material identification sweeper or cleaning robot according to the embodiments of the present disclosure reuses the existing accelerometer of the sweeper on the basis of components of the existing sweeper or the cleaning robot. Thus, the floor material identification sweeper or cleaning robot according to the embodiments of the present disclosure has low cost input and high identification accuracy and robustness during the identification. The identification effect is related to the accelerometer of the sweeper. Further, even if hair is twined around a main roller or other parts of the sweeper, the vibration signal and frequency components would not be changed. As a result, the identification performance of the sweeper is stable, and the reliability of the floor material identification can be enhanced.

The sweeper or a sweeping-mopping robot with a similar function can avoid the floor of the carpet for further operation after the floor material has been identified; or at a critical region of carpet/non-carpet floor, the sweeper or the sweeping-mopping robot can adjust a cleaning mode timely, for example switch among various modes including a simultaneous sweeping-and-mopping mode, an only-sweeping mode, or an only-mopping mode. Meanwhile, the sweeper or the sweeping-mopping robot can adjust a suction force of the cleaning mode timely at a critical region of the floor of different materials.

In a floor material identification method according to some embodiments of the present disclosure, the identification is based on a frequency signal, and the details not disclosed in the floor material identification method of this embodiment may refer to the implementation of the floor material identification method as described in the embodiments.

Figure 6:
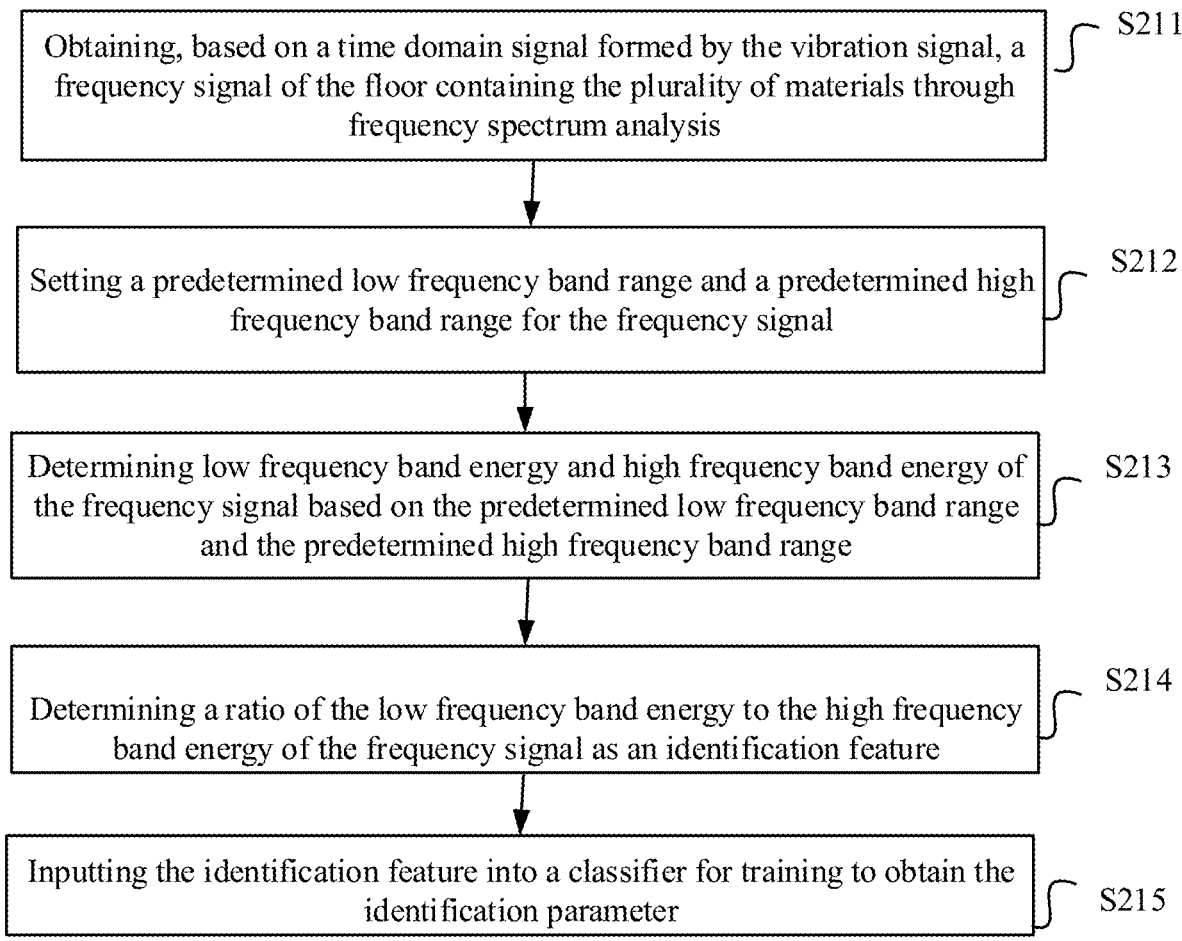
FIG. 6 is a schematic diagram showing identification steps based on a frequency signal in a floor material identification method according to an embodiment of the present disclosure.

FIG. 6 is a schematic diagram showing identification steps based on a frequency signal in a floor material identification method according to an embodiment of the present disclosure.

As shown in FIG. 6, performing the floor material identification based on the frequency signal in the floor material identification method according to the embodiments of the present disclosure includes actions at S211 and S215.

At S211, a frequency signal of the floor of the material among the plurality of materials is obtained through frequency spectrum analysis based on a time domain signal formed from the vibration signal.

At S212, a predetermined low frequency band range and a predetermined high frequency band range for the frequency signal are set.

At S213, low frequency band energy and high frequency band energy of the frequency signal are determined based on the predetermined low frequency band range and the predetermined high frequency band range.

At S214, a ratio of the low frequency band energy to the high frequency band energy of the frequency signal is determined as an identification feature.

At S215, the at least one identification parameter is obtained by inputting the identification feature into a classifier for training.

In some embodiments of the present disclosure, obtaining, based on the time domain signal formed from the vibration signal, the frequency signal of the floor of the material among the plurality of materials through frequency spectrum analysis includes: obtaining a windowed time domain signal by windowing the time domain signal; and obtaining, based on the windowed time domain signal, the frequency signal through the frequency spectrum analysis. The spectral analysis includes a Fourier transform or a wavelet transform.

In some embodiments of the present disclosure, the floor material identification method further includes, subsequent to obtaining a frequency signal of the floor of the material among the plurality of materials at S211: labeling the frequency signal with a hard floor or a soft floor. The hard floor includes a floor tile, a wooden floor, and a marble, and the soft floor includes a carpet and a plastic cement.

In the present disclosure, when identifying the floor material, the material of the floor of the to-be-identified material is determined by comparing the ratio of the low frequency band energy to the high frequency band energy of the vibration signal of the floor of the to-be-identified material with the threshold. For example, when the ratio of the low frequency band energy to the high frequency band energy falls within a threshold relating to a ratio of low frequency band energy and high frequency band energy of a floor of a carpet, it is determined that the floor is hard.

In this process, an accurate identification parameter needs to be obtained. That is, a reasonable low frequency band range, high frequency band range, and threshold needs to be obtained. Thus, in the present disclosure, the low frequency band range, the high frequency band range, and the threshold relating to the ratio of the low frequency band energy to the high frequency band energy are determined by training the identification parameter by the classifier. The training is performed repeatedly until a division in which the identification result has the highest accuracy is obtained as the final identification parameter. After the final identification parameter is obtained, the accurate identification of the floor material can be realized, and the identification accuracy of the classifier on the floor identification is greatly improved. The classifier may use a neural network classifier, and may also use support vector machine, or other classification methods.

In an embodiment, the time domain vibration signal is windowed. For example, a continuous time domain signal is divided into segments in seconds. That is, a rectangular window is added.

A frequency spectrum of each segment of the signal is obtained by the Fourier transform, the wavelet transform, and other spectral analysis methods.

The transformed frequency spectrum, i.e., the frequency signal, is labeled with the hard floor and the soft floor. That is, the transformed frequency spectrum is classified into two categories including a windowed time domain labeled with the hard floor, and a windowed time domain labeled with the soft floor. The windowed time domain labeled with the hard floor may indicates a floor tile, a wooden floor, a marble, and the like, and the windowed time domain labeled with the soft floor may indicates a floor of a carpet.

The identification feature is determined as an energy ratio of the low frequency band and the high frequency band, i.e., the ratio of the low frequency band energy to the high frequency band energy.

During this process, it is necessary to input the identification feature into the classifier for training and learning. In addition, for the identification feature, it is necessary to determine the at least one identification parameter such as the low frequency band range, the high frequency band range, and the threshold relating to the ratio of the low frequency band energy to the high frequency band energy.

In some embodiments of the present disclosure, the division of the frequency band refers to the beginning and ending of the low frequency band and the high frequency band. For example, for the frequency spectrum ranging from 0 Hz to 50 Hz, a frequency spectrum ranging from 5 Hz to 20 Hz is defined as the low frequency band, and a frequency spectrum ranging from 25 Hz to 40 Hz is defined as the high frequency band, which is one of the divisions of the frequency band. The ratio of the low frequency band energy to the high frequency band energy is determined as the identification feature.

The training refers to finding the best division among all the above feasible divisions. For example, there are thousands of divisions for the low frequency band and the high frequency band based on the arrangement and combination modes, and each possible division has a corresponding final identification accuracy. The division corresponding to the highest identification accuracy is determined as a training result. Similarly, the training of the threshold relating to the ratio of the low frequency band energy to the high frequency band energy is the same to the above. In addition, the learning of the threshold refers to setting a threshold for one classification to maximize the classification accuracy of the two types of signals.

In the floor material identification method according to some embodiments of the present disclosure, the vibration signal generated by the sweeper or the cleaning robot when operating on the floor of the material among the plurality of materials is acquired, then the at least one identification parameter for the floor material identification is determined based on the vibration signal, and then the floor material type is identified based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

According to some embodiments of the present disclosure, a floor material identification system is provided, and the details not disclosed in the floor material identification system of this embodiment may refer to the implementation of the floor material identification method or device as described other embodiments.

Figure 7:
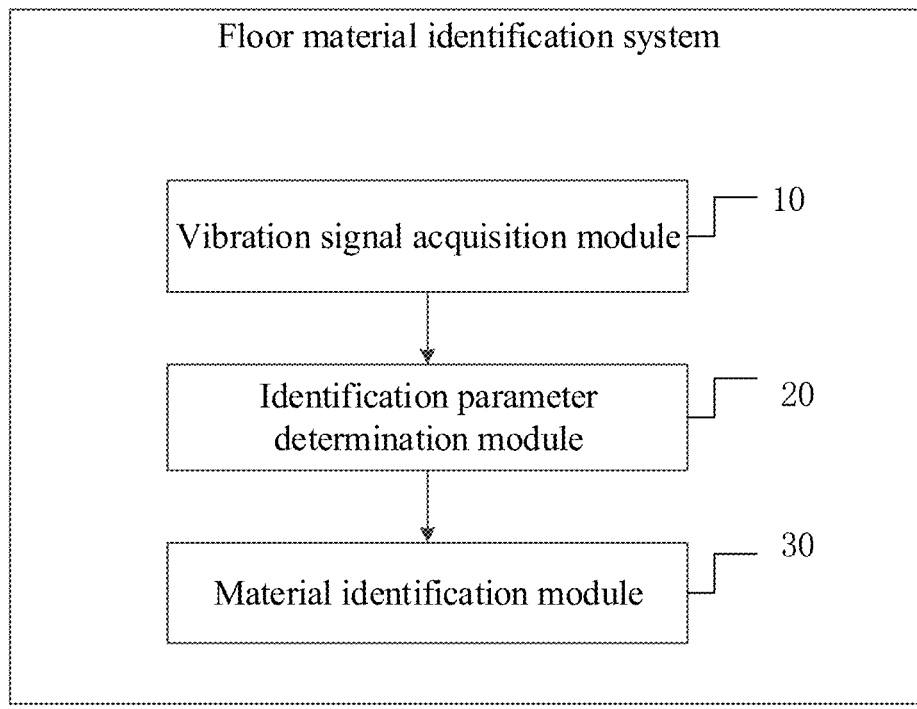
FIG. 7 is a schematic structural diagram showing a floor material identification system according to an embodiment of the present disclosure.

FIG. 7 is a schematic structural diagram showing a floor material identification system according to an embodiment of the present disclosure.

As shown in FIG. 7, the floor material identification system according to some embodiments of the present disclosure includes a vibration signal acquisition device 10, an identification parameter determination device 20, and a material identification device 30.

The vibration signal acquisition device 10 is configured to acquire a vibration signal generated by a cleaning robot when operating on a floor of a material of a plurality of materials.

In the present disclosure, by means of a machine, which continuously vibrates during its operation, of the cleaning robot such as the sweeper, a mopping robot, or a sweeping-mopping robot based on different degrees of vibration mitigation and absorption by the floor of different materials, the vibrating machine can generate different vibration signals on the floor of the different materials. Then, the vibration signals can be simultaneously acquired by means of the vibration signal acquisition device, such as an accelerometer of the sweeping gyroscope disposed in the sweeper, the mopping robot, or the sweeping-mopping robot.

The identification parameter determination device 20 is configured to determine at least one identification parameter for floor material identification based on the vibration signal.

The numbers and frequencies at which high frequency bands and low frequency bands of the vibration signals from the floor of different materials or frequency signals transformed from the vibration signals occur are different from each other. As a result, in some embodiments of the present disclosure, a ratio of low frequency band energy to high frequency band energy of the vibration signal or the frequency signal within a period of time is determined as an identification feature, and then a reasonable threshold relating to the ratio is set to perform the identification.

In this process, an accurate identification parameter needs to be obtained. That is, a reasonable low frequency band range, high frequency band range, and threshold needs to be obtained. Thus, in the present disclosure, the low frequency band range, the high frequency band range, and the threshold relating to the ratio of the low frequency band energy to the high frequency band energy are determined by training the identification parameter by the classifier. The training is performed repeatedly until a division in which the identification result has the highest accuracy is obtained as the final identification parameter. After the final identification parameter is obtained, the accurate identification of the floor material can be realized, and the identification accuracy of the classifier on the floor identification is greatly improved. Thus, the identification parameter required to be determined in the present disclosure includes the low frequency band range of the vibration signal, the high frequency band range of the vibration signal, and the threshold relating to the ratio of the low frequency band energy to the high frequency band energy of the vibration signal.

The floor material identification according to the embodiments of the present disclosure may be analyzed and identified through a time domain signal of the vibration signal, or may be identified based on a frequency signal transformed from the vibration signal.

Further, performing the floor material identification based on the time domain signal of the vibration signal in the floor material identification method according to the embodiments of the present disclosure includes actions at S201 to S204.

At S201, a predetermined low frequency band range and a predetermined high frequency band range for the vibration signal are set.

At S202, low frequency band energy and high frequency band energy of the vibration signal are determined based on the predetermined low frequency band range and predetermined high frequency band range.

At S203, a ratio of the low frequency band energy to the high frequency band energy is determined as an identification feature.

At S204, the at least one identification parameter is obtained by inputting the identification feature into a classifier for training.

In addition, performing the floor material identification based on the frequency signal in the floor material identification method according to the embodiments of the present disclosure includes actions at S211 and S215.

At S211, a frequency signal of the floor of the material among the plurality of materials is obtained through frequency spectrum analysis based on a time domain signal formed from the vibration signal.

At S212, a predetermined low frequency band range and a predetermined high frequency band range for the frequency signal are set.

At S213, low frequency band energy and high frequency band energy of the frequency signal are determined based on the predetermined low frequency band range and the predetermined high frequency band range.

At S214, a ratio of the low frequency band energy to the high frequency band energy of the frequency signal is determined as an identification feature.

At S215, the at least one identification parameter is obtained by inputting the identification feature into a classifier for training.

In some embodiments of the present disclosure, obtaining the frequency signal of the floor of the material among the plurality of materials through frequency spectrum analysis based on the time domain signal formed from the vibration signal includes: obtaining a windowed time domain signal by windowing the time domain signal; and obtaining, based on the windowed time domain signal, the frequency signal through the frequency spectrum analysis. The spectral analysis includes a Fourier transform or a wavelet transform.

In some embodiments of the present disclosure, the floor material identification method further includes, subsequent to obtaining a frequency signal of the floor of the material among the plurality of materials at S211: labeling the frequency signal with a hard floor or a soft floor. The hard floor includes a floor tile, a wooden floor, and a marble, and the soft floor includes a carpet and a plastic cement.

In the present disclosure, when identifying the floor material, the material of the floor of the to-be-identified material is determined by comparing the ratio of the low frequency band energy to the high frequency band energy of the vibration signal of the floor of the to-be-identified material with the threshold.

In this process, an accurate identification parameter needs to be obtained. That is, a reasonable low frequency band range, high frequency band range, and threshold needs to be obtained. Thus, in the present disclosure, the low frequency band range, the high frequency band range, and the threshold relating to the ratio of the low frequency band energy to the high frequency band energy are determined by training the identification parameter by the classifier. The training is performed repeatedly until a division in which the identification result has the highest accuracy is obtained as the final identification parameter. After the final identification parameter is obtained, the accurate identification of the floor material can be realized, and the identification accuracy of the classifier on the floor identification is greatly improved.

In an embodiment, the time domain vibration signal is windowed. For example, a continuous time domain signal is divided into segments in seconds. That is, a rectangular window is added.

A frequency spectrum of each segment of the signal is obtained by the Fourier transform, the wavelet transform, and other spectral analysis methods.

The transformed frequency spectrum, i.e., the frequency signal, is labeled with the hard floor and the soft floor. That is, the transformed frequency spectrum is classified into two categories including a windowed time domain labeled with the hard floor, and a windowed time domain labeled with the soft floor. The windowed time domain labeled with the hard floor may indicates a floor tile, a wooden floor, a marble, and the like, and the windowed time domain labeled with the soft floor may indicates a floor of a carpet.

The identification feature is determined as an energy ratio of the low frequency band and the high frequency band, i.e., the ratio of the low frequency band energy to the high frequency band energy.

During this process, it is necessary to input the identification feature into the classifier for training and learning. Further, for the identification feature, it is necessary to determine the at least one identification parameter such as the low frequency band range, the high frequency band range, and the threshold relating to the ratio of the low frequency band energy to the high frequency band energy.

In some embodiments of the present disclosure, the division of the frequency band refers to the beginning and ending of the low frequency band and the high frequency band. For example, for the frequency spectrum ranging from 0 Hz to 50 Hz, a frequency spectrum ranging from 5 Hz to 20 Hz is defined as the low frequency band, and a frequency spectrum ranging from 25 Hz to 40 Hz is defined as the high frequency band, which is one of the divisions of the frequency band. The ratio of the low frequency band energy to the high frequency band energy is determined as the identification feature.

The training refers to finding the best division among all the above feasible divisions. For example, there are thousands of divisions for the low frequency band and the high frequency band based on the arrangement and combination modes, and each possible division has a corresponding final identification accuracy. The division corresponding to the highest identification accuracy is determined as a training result. Similarly, the training of the threshold relating to the ratio of the low frequency band energy to the high frequency band energy is the same to the above. In addition, the learning of the threshold refers to setting a threshold for one classification to maximize the classification accuracy of the two types of signals.

The material identification device 30 is configured to identify a floor material type based on the at least one identification parameter.

Firstly, to-be-identified vibration signals generated on the to-be-identified floor are acquired, and then the to-be-identified vibration signals are identified based on the at least one identification parameter to obtain the floor material classification.

During the identification, the low frequency band range and the high frequency band range of the vibration signal from the floor of the-to-be-identified material are determined based on the at least one identification parameter, then a total energy of the low frequency band range and a total energy of the high frequency band range are calculated, respectively. Finally, the material of the floor of the to-be-identified material is determined by comparing the ratio of the low frequency band energy to the high frequency band energy with the threshold. For example, when the ratio of the low frequency band energy to the high frequency band energy falls within a threshold relating to a ratio of low frequency band energy and high frequency band energy of a floor of a carpet, it is determined that the floor is hard.

In the floor material identification system according to some embodiments of the present disclosure, the vibration signal generated by the sweeper or the cleaning robot when operating on the floor of the material among the plurality of materials is acquired by the vibration signal acquisition device 10, then the at least one identification parameter for the floor material identification is determined by the identification parameter determination device 20 based on the vibration signal, and then the floor material type is identified by the material identification device 30 based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

The floor material identification sweeper or cleaning robot according to the embodiments of the present disclosure reuses the existing accelerometer of the sweeper on the basis of components of the existing sweeper or the cleaning robot. Thus, the floor material identification sweeper or cleaning robot according to the embodiments of the present disclosure has low cost input and high identification accuracy and robustness during the identification. The identification effect is related to the accelerometer of the sweeper. Further, even if hair is twined around a main roller or other parts of the sweeper, the vibration signal and frequency components would not be changed. As a result, the identification performance of the sweeper is stable, and the reliability of the floor material identification can be enhanced.

The sweeper or a sweeping-mopping robot with a similar function can avoid the floor of the carpet for further operation after the floor material has been identified; or at a critical region of carpet/non-carpet floor, the sweeper or the sweeping-mopping robot can adjust a cleaning mode timely, for example switch among various modes including a simultaneous sweeping-and-mopping mode, an only-sweeping mode, or an only-mopping mode. Meanwhile, the sweeper or the sweeping-mopping robot can adjust a suction force of the cleaning mode timely at a critical region of the floor of different materials.

This embodiment provides a floor material identification device, and the details not disclosed in the floor material identification device of this embodiment may refer to the implementation of the floor material identification method or system as described in other embodiments.

Figure 8:
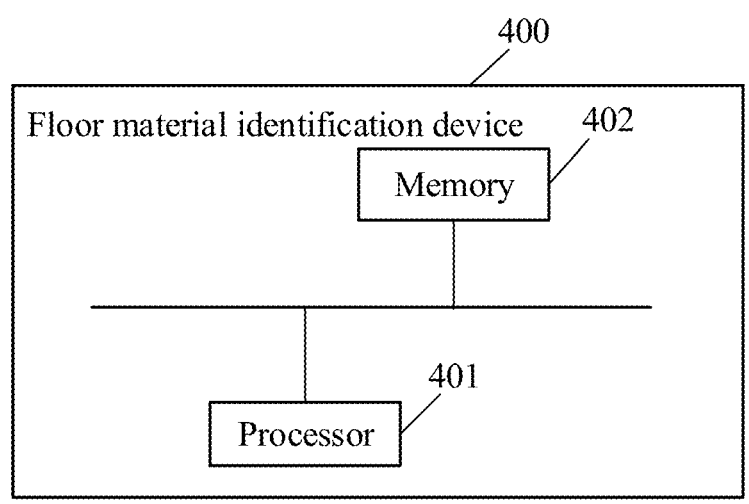
FIG. 8 is a schematic structural diagram showing a floor material identification device according to an embodiment of the present disclosure.

FIG. 8 is a schematic structural diagram showing a floor material identification device according to an embodiment of the present disclosure.

As shown in FIG. 8, a floor material identification device 400 includes a memory 402 configured to store executable instructions, and a processor 401 configured to be connected to the memory 402 to execute the executable instructions to implement the floor material identification method.

FIG. 8 is merely an example of the floor material identification device 400 and does not constitute a limitation on the floor material identification device 400. The floor material identification device may include more or less components than those illustrated, or some components or different components may be combined. For example, the floor material identification device 400 may further include input and output devices, network access devices, buses, or the like.

The processor 401 (Central Processing Unit, CPU) may also be another general purpose processor, a Digital Signal Processor (DSP), an Application Specific Integrated Circuit (ASIC), a Field-Programmable Gate Array (FPGA), or other programmable logic device, a discrete gate or transistor logic device, a discrete hardware component, or the like. The general-purpose processor may be a microprocessor, or the processor 401 may be any conventional processor or the like. The processor 401 is a control center of the floor material identification device 400, and is configured to connect various parts of the entire floor material identification device 400 via various interfaces and lines.

The memory 402 may be configured to store computer readable instructions. The processor 401 may implement various functions of the surface material identification device 400 by executing or performing the computer readable instructions or devices stored in the memory 402 and invoking data stored in the memory 402. The memory 402 may mainly include a storage program region and a storage data region. An operating system, an application program required by at least one function (such as a sound playing function, an image playing function), or the like may be stored in the storage program region, and data created from the use of the computer device 30 of the floor material identification device 400 may be stored in the storage data region. Additionally, the memory 402 may include a hard disk, a memory, a plug-in hard disk, a Smart Media Card (SMC), a Secure Digital (SD) card, a Flash Card, at least one magnetic disk storage device, a flash memory device, a Read-Only Memory (ROM), a Random Access Memory (RAM), or other non-volatile/volatile storage devices.

The integrated devices of the floor material identification device 400, if implemented in the form of software functional devices and sold or used as stand-alone products, may be stored in a computer-readable storage medium. It will thus be appreciated that all or part of the flowchart for implementing the methods as described in the above embodiments may also be implemented by instructing associated hardware by means of the computer-readable instructions that may be stored on the computer-readable storage medium. The computer-readable instructions, when executed by the processor, can implement the steps of the various method embodiments as described above.

The embodiment provides a computer-readable storage medium having a computer program stored thereon. The computer program, when executed by the processor, implements the floor material identification method in other embodiments.

With the floor material identification device and the computer storage medium according to some embodiments of the present disclosure, the vibration signal generated by the sweeper or the cleaning robot when operating on the floor of the material among the plurality of materials is acquired, then the at least one identification parameter for the floor material identification is determined based on the vibration signal, and then the floor material type is identified based on the at least one identification parameter. With the floor material identification technology of the present disclosure, the floor materials are distinguished by characteristics of different vibration signals from the floor of different materials to achieve low-cost identification and improve identification accuracy and robustness. Thus, identification performance is stable, and reliability of the floor material identification can be further improved. As a result, it is possible to solve problems such as high cost, low reliability, and inaccurate identification result of the existing floor material identification technology.

The floor material identification sweeper or cleaning robot according to the embodiments of the present disclosure reuses the existing accelerometer of the sweeper on the basis of components of the existing sweeper or the cleaning robot. Thus, the floor material identification sweeper or cleaning robot according to the embodiments of the present disclosure has low cost input and high identification accuracy and robustness during the identification. The identification effect is related to the accelerometer of the sweeper. Further, even if hair is twined around a main roller or other parts of the sweeper, the vibration signal and frequency components would not be changed. As a result, the identification performance of the sweeper is stable, and the reliability of the floor material identification can be enhanced.

The sweeper or a sweeping-mopping robot with a similar function can avoid the floor of the carpet for further operation after the floor material has been identified; or at a critical region of carpet/non-carpet floor, the sweeper or the sweeping-mopping robot can adjust a cleaning mode timely, for example switch among various modes including a simultaneous sweeping-and-mopping mode, an only-sweeping mode, or an only-mopping mode. Meanwhile, the sweeper or the sweeping-mopping robot can adjust a suction force of the cleaning mode timely at a critical region of the floor of different materials.

The embodiments of the present disclosure can be provided as a method, device or computer program product. Accordingly, this present disclosure may take the form of an entire hardware embodiment, an entire software embodiment, or an embodiment combining software and hardware aspects. In one embodiment, the present disclosure may take the form of a computer program product embodied on one or more computer-usable storage medium (including, but not limited to, a magnetic disk storage, a CD-ROM, an optical storage, and the like) including computer-usable program codes.

The present disclosure is described with reference to the flowchart and/or block diagrams of the method, device (system), and computer program product according to embodiments of the present disclosure. It will be understood that each flow and/or block of the flowcharts and/or block diagrams, and combinations of flows and/or blocks in the flowcharts and/or block diagrams, can be implemented by the computer program instructions. These computer program instructions may be provided to a processor of a general purpose computer, special purpose computer, embedded processor, or other programmable data processing device to produce a machine, and the instructions, which are executed by the processor of the computer or other programmable data processing device, create means for implementing the functions specified in the flow(s) of the flowchart and/or the block(s) of the block diagram.

These computer program instructions may also be stored in a computer-readable memory that can direct a computer or other programmable data processing device to function in a particular manner, and the instructions stored in the computer-readable memory can create a manufacturing article including instruction means, and the instruction means can implement the function specified in the flow(s) of the flowchart and/or the block(s) of the block diagram.

These computer program instructions may also be loaded onto the computer or other programmable data processing device, and a series of operational steps are performed on the computer or other programmable device to produce a computer implemented processing, and the instructions executed on the computer or other programmable device can provide steps for implementing the functions specified in the flow(s) of the flowchart and/or the block(s) of the block diagram.

The term used herein is merely for the purpose of describing particular embodiments, and is not intended to limiting the present disclosure. As used herein and in the appended claims, the singular forms "a", "an", and "the" are intended to include the plural forms as well, unless the context clearly indicates otherwise. It should also be understood that the term "and/or" as used herein refers to and include any and all possible combinations of one or more of the associated listed items.

It should be understood that while the terms "first", "second", "third", etc. may be used herein to describe various information, such information should not be limited to such terms. These terms are merely used to distinguish one type of information from another. For example, a first information may also be referred to as a second information. Similarly, the second information may also be referred to as the first information, without departing from the scope of the present disclosure. Depending on the context, the word "if" as used herein may be interpreted as "when" or "while" or "in response to determining".

What is claimed is:

1. A floor material identification method, applied in a cleaning robot, the floor material identification method comprising:
    acquiring a vibration signal generated by a cleaning robot when operating on a floor of a material among a plurality of materials;
    setting a predetermined low frequency band range and a predetermined high frequency band range, both selected from a frequency band range for the vibration signal;
    determining low frequency band energy and high frequency band energy of the vibration signal based on the predetermined low frequency band range and the predetermined high frequency band range;

determining a ratio of the low frequency band energy to the high frequency band energy as an identification feature;

obtaining at least one identification parameter by inputting the identification feature into a classifier for training; and identifying a floor material type based on the at least one identification parameter.

2. The floor material identification method according to claim 1, wherein identifying a floor material type based on the at least one identification parameter comprises:

acquiring a to-be-identified vibration signal generated by the cleaning robot when operating on a to-be-identified floor; and obtaining a floor material type by identifying the to-be-identified vibration signal based on the at least one identification parameter.

3. A floor material identification device, comprising:

a memory configured to store executable instructions; and a processor configured to be connected to the memory to execute the executable instructions to implement the floor material identification method according to claim 1.

4. A floor material identification method, applied in a cleaning robot, the floor material identification method comprising:

acquiring a vibration signal generated by a cleaning robot when operating on a floor of a material among a plurality of materials;

obtaining, based on a time domain signal formed by the vibration signal, a frequency signal of the floor of the material among the plurality of materials through frequency spectrum analysis;

setting a predetermined low frequency band range and a predetermined high frequency band range for the frequency signal;

determining low frequency band energy and high frequency band energy of the frequency signal based on the predetermined low frequency band range and the predetermined high frequency band range;

determining a ratio of the low frequency band energy to the high frequency band energy of the frequency signal as an identification feature;

obtaining the at least one identification parameter by inputting the identification feature into a classifier for training; and identifying a floor material type based on the at least one identification parameter.

5. The floor material identification method according to claim 4, wherein obtaining, based on a time domain signal formed by the vibration signal, a frequency signal of the floor of the material among the plurality of materials through the frequency spectrum analysis comprises:

obtaining a windowed time domain signal by windowing the time domain signal formed by the vibration signal; and obtaining, based on the windowed time domain signal, the frequency signal through the frequency spectrum analysis.

6. The floor material identification method according to claim 4, further comprising, subsequent to obtaining a frequency signal of the floor of the material among the plurality of materials:

labeling the frequency signal with a hard floor or a soft floor, wherein the hard floor comprises a floor tile, a wooden floor, and a marble; and the soft floor comprises a carpet and a plastic cement.

7. A floor material identification system, comprising:

a vibration signal acquisition device configured to acquire a vibration signal generated by a cleaning robot when operating on a floor of a material among a plurality of materials;

an identification parameter determination device configured to determine at least one identification parameter for floor material identification based on the vibration signal; and a material identification device configured to identify a floor material type based on the at least one identification parameter;

wherein the identification parameter determination device is further configured to:

obtain, based on a time domain signal formed by the vibration signal, a frequency signal of the floor comprising the plurality of materials through frequency spectrum analysis;

set a predetermined low frequency band range and a predetermined high frequency band range for the frequency signal;

determine low frequency band energy and high frequency band energy of the frequency signal based on the predetermined low frequency band range and the predetermined high frequency band range;

determine a ratio of the low frequency band energy to the high frequency band energy of the frequency signal as an identification feature; and input the identification feature into a classifier for training to obtain the at least one identification parameter.

8. The floor material identification system according to claim 7, wherein said obtaining, based on the time domain signal formed by the vibration signal, the frequency signal of the floor comprising the plurality of materials through the frequency spectrum analysis comprises:

obtaining a windowed time domain signal through windowing the time domain signal formed by the vibration signal; and obtaining the frequency signal through the frequency spectrum analysis based on the windowed time domain signal.

9. The floor material identification system according to claim 7, further comprising, subsequent to said obtaining the frequency signal of the floor comprising the plurality of materials:

labeling the frequency signal with a hard floor or a soft floor, wherein:

the hard floor comprises a floor tile, a wooden floor, and a marble; and the soft floor comprises a carpet and a plastic cement.

* * * * *